US011358487B2

(12) United States Patent
Beez et al.

(10) Patent No.: US 11,358,487 B2
(45) Date of Patent: Jun. 14, 2022

(54) METHOD FOR CHARGING ELECTRIC CONSUMERS

(71) Applicant: Mahle International GmbH, Stuttgart (DE)

(72) Inventors: Steve Beez, Masserberg (DE); Sebastian Ewert, Stuttgart (DE); Nicole Heinrich, Freiberg (DE); Walter Krepulat, Stuttgart (DE)

(73) Assignee: Mahle International GmbH

( * ) Notice: Subject to any disclaimer, the term of this patent is extended or adjusted under 35 U.S.C. 154(b) by 366 days.

(21) Appl. No.: 16/357,297

(22) Filed: Mar. 18, 2019

(65) Prior Publication Data
US 2019/0283620 A1 Sep. 19, 2019

(30) Foreign Application Priority Data

Mar. 19, 2018 (DE) .......................... 102018204157.1

(51) Int. Cl.
*B60L 53/63* (2019.01)
*B60L 53/67* (2019.01)
*B60L 53/62* (2019.01)
*B60L 53/14* (2019.01)
*H02J 3/32* (2006.01)
*H02J 7/00* (2006.01)
*H02J 3/14* (2006.01)
*H02J 3/26* (2006.01)

(52) U.S. Cl.
CPC ............... *B60L 53/63* (2019.02); *B60L 53/14* (2019.02); *B60L 53/62* (2019.02); *B60L 53/67* (2019.02); *H02J 3/14* (2013.01); *H02J 3/26* (2013.01); *H02J 3/32* (2013.01); *H02J 7/0027* (2013.01)

(58) Field of Classification Search
CPC ..................................................... B60L 53/63
USPC ........................................................ 320/109
See application file for complete search history.

(56) References Cited

U.S. PATENT DOCUMENTS

2009/0189456 A1 7/2009 Skutt
2014/0001850 A1 1/2014 Guillemin
(Continued)

FOREIGN PATENT DOCUMENTS

DE 10 2011 084 216 A1 4/2013
DE 10 2012 221 473 A1 5/2014
DE 2919352 * 9/2015 ............... H02J 3/26
(Continued)

OTHER PUBLICATIONS

European Search Report dated Jun. 5, 2019 for EP 19158287.
(Continued)

*Primary Examiner* — Edward Tso
*Assistant Examiner* — Ahmed H Omar
(74) *Attorney, Agent, or Firm* — Fishman Stewart PLLC

(57) ABSTRACT

A method for charging electric consumers at an electricity grid with multiple phases may include measuring a phase current of each of the multiple phases of the electricity grid at a balance point. The method may also include determining to which of the multiple phases each electric consumer of the electric consumers is connected for charging via the balance point. Additionally, the method may include holding an unbalanced load of the multiple phases below an unbalanced load threshold value via communicating a power specification to each electric consumer connected for charging.

20 Claims, 1 Drawing Sheet

(56) References Cited

U.S. PATENT DOCUMENTS

2014/0268947 A1* 9/2014 Phadke ................. H02J 1/102
                                                                                        363/69
2016/0064932 A1* 3/2016 Fischer ................... H02J 3/26
                                                                                        307/18

FOREIGN PATENT DOCUMENTS

| EP | 2735468 | A2 | 5/2014 |
| EP | 2919352 | A1 | 9/2015 |
| JP | 2011-78 288 | A | 4/2011 |

OTHER PUBLICATIONS

English Abstract for EP2919352.
English Abstract for EP2735468A2.
English abstract for DE-10 2011 084 216.
English abstract for DE-10 2012 221473.
English abstract for JP-2011078288.

* cited by examiner

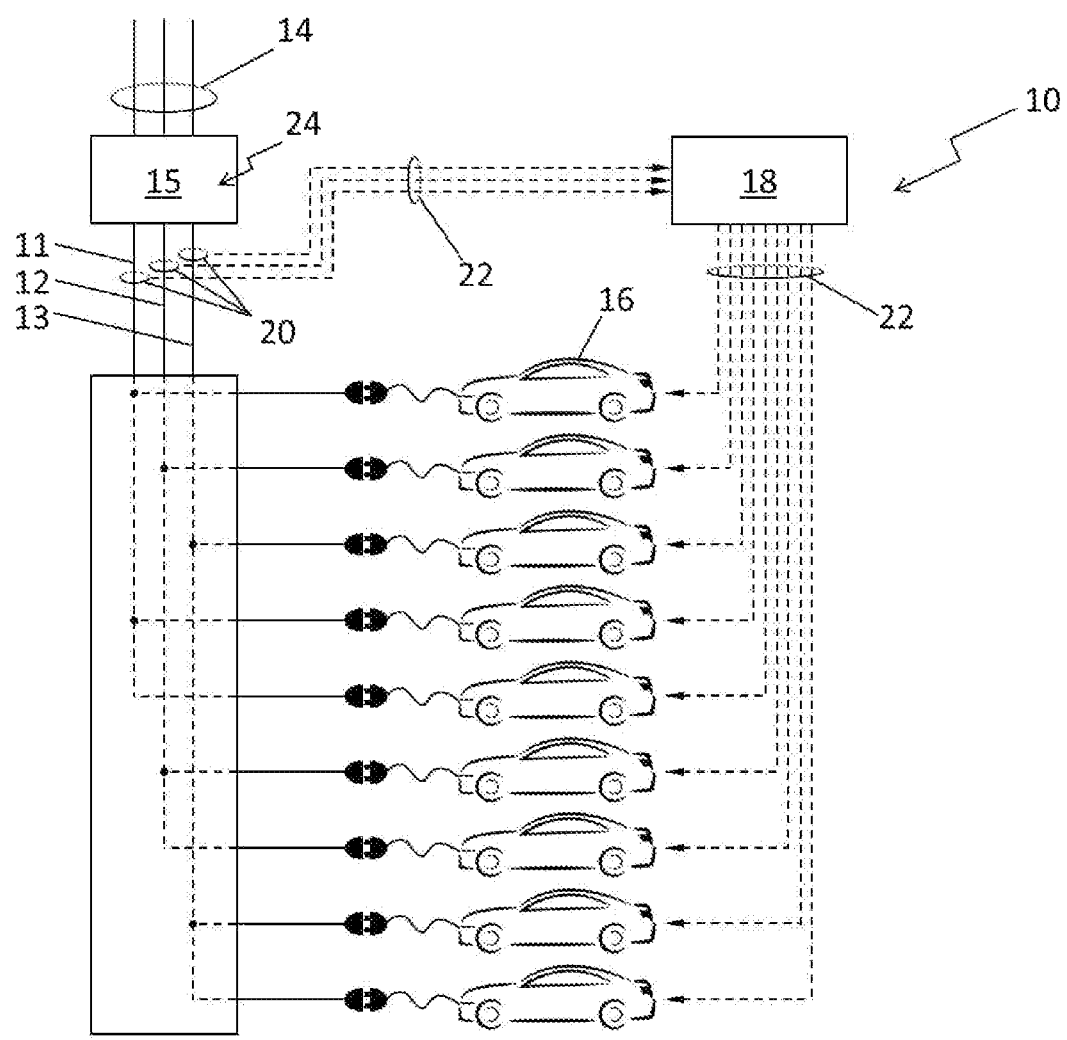

METHOD FOR CHARGING ELECTRIC CONSUMERS

CROSS-REFERENCE TO RELATED APPLICATION

This application claims priority to German Application No. DE 10 2018 204 157.1, filed on Mar. 19, 2018, the contents of which are hereby incorporated by reference in its entirety.

TECHNICAL FIELD

The invention relates to a method for charging electric consumers, electric vehicles for example, at an electricity grid with multiple phases.

BACKGROUND

Nowadays electric vehicles charge with single or multiple-phase alternating current, or with direct current. Charging with alternating current is possible here, according to the standard, during operation from 6 to 63 amperes on one or more phases. Many energy supply companies and distribution network operators require that individual consumers avoid an unbalanced load of more than 20 amperes. There are, however, electric vehicles on the market which charge at more than 20 amperes from a single phase. This can, however, give rise to an unbalanced load that lies above the maximum unbalanced load specified by the energy supply companies and distribution network operators.

The invention is based on the object of making available an improved or at least different form of embodiment of a method for charging electric consumers at an electricity grid with multiple phases which is in particular characterized by the avoidance of excessively high unbalanced loads.

SUMMARY

This object is achieved according to the invention by the subject matter of the independent claim(s). Advantageous developments are the objects of the dependent claim(s).

The invention is based on the fundamental idea of monitoring the phase currents of the individual phases and appropriately adjusting the charging power of the electric vehicles or the electric consumers in order not to exceed the maximum permissible unbalanced load. It is therefore provided according to the invention that phase currents of the phases of the electricity grid are measured at a balance point, that a determination is made of the phase to which the electric consumer is connected for each electric consumer connected for charging to the electricity grid via the balance point, and that an unbalanced load of the phases is held below an unbalanced load threshold value in that a power specification is communicated to each electric consumer connected for charging. A regulation possibility for the phase currents arises from this, so that the unbalanced load can be held below the unbalanced load threshold value. At the same time, if an electric consumer is connected for charging to all the phases, a higher individual charging current can be achieved than in a method in which the maximum charging currents are held down to a threshold value at which the unbalanced load threshold cannot be exceeded. The unbalanced load threshold value is usually specified by the energy supply company or the distribution network operator. The unbalanced load threshold value lies, for example, at 20 amperes.

In the description and the attached claims, the unbalanced load refers to the maximum difference of the loads occurring at the time concerned between respectively any two phases of the electricity grid at the balance point.

One favourable possibility provides that the power specifications for the electric consumers are set in such a way that each load difference between each possible pair of phases of the electricity grid at the balance point is smaller than the unbalanced load threshold value. It is possible in this way to ensure that the unbalanced load remains below the unbalanced load threshold value.

In the description and the attached claims, a balance point refers to a point in the electricity grid at which the unbalanced load threshold should be satisfied. Such a balance point can, for example, be a domestic electric connection, the output of a medium-voltage transformer, or a virtual energy supply grid.

A further favourable possibility provides that the power specification includes how much charging power may be additionally drawn at the time concerned, or by how much the charging power must be reduced. The phase currents can in this way be regulated by means of the power specification, so that the greatest possible electric charging power can be made available to connected electric consumers without the unbalanced load exceeding the unbalanced load threshold value.

A further particularly favourable possibility provides that when the phase current of one phase lies below a load threshold value and the phase current of this phase is smaller than the lowest measured phase current of another phase with the addition of the unbalanced load threshold value, the fact that the additional charging power may be drawn is signalled by the power specification. It is possible in this way to ensure that, when power reserves are available, these power reserves can also be exploited by the connected electric consumer. The level of the additional power is found from the distance from the respective threshold values, wherein the smaller of the two distances from the threshold values is relevant for the possible power increase.

The particularly favourable possibility further provides that when the phase current of one phase lies above a load threshold value or the phase current of this phase is greater than the lowest measured phase current of one of the other phases with the addition of the unbalanced load threshold value, the fact that the charging power must be reduced is signalled by the power specification. In this way it is possible to react to load changes in the electricity grid in order to prevent an overload or an exceeding of the unbalanced load threshold value. The level of the power to be reduced results from the respective exceeding of the load threshold value or of the unbalanced load threshold value, wherein, when both threshold values are exceeded, the higher value is relevant, so that both threshold values are satisfied after the reduction of the charging power has been carried out.

One advantageous solution provides that the power specification comprises a maximum charging power available at the time concerned. The power specification can thereby signal to the connected electric consumer what the maximum charging power available is, for example when the electric consumer has just been connected. In this way the regulation time until the optimum charging power has been set can be shortened.

A further advantageous solution provides that the maximum charging power available at the time concerned of the phase is determined taking into account at least the phase currents at the time concerned, a maximum permissible power of the respective phase and a maximum permissible unbalanced load between the phases. Through this, when determining the maximum charging power available, it can be ensured that the phase of the electricity grid is not overloaded and that the unbalanced load does not exceed the unbalanced load threshold value.

An expedient variant provides that when an electric consumer is connected for charging, a determination is made of the phase to which the electric consumer is connected, and a maximum charging power available at the time concerned of the phase to which the electric consumer is connected is determined, and the maximum charging power available at the time concerned is communicated to the electric consumer. Thus when the electric consumer is connected, it receives the information as to how much power it can draw for charging via the phase. The optimum utilization of the electricity grid is achieved through this in a particularly short time.

A further expedient variant provides that the power specifications are selected in such a way that an individual load of the individual phases is in addition held in each case below a load threshold value. The overload of the individual phases of the electricity grid is thereby prevented, so that a secure and stable operation is enabled. The load threshold value is advantageously given by a maximum permissible load at the balance point.

An advantageous possibility provides that the phase currents at the balance point are determined continuously, and the power specification for the electric consumers connected for charging are continuously adjusted on that basis and communicated to the respective electric consumer. It is possible in this way to react to changes in the load conditions at the individual phases. It is, in particular, possible, if the charging of the electric consumer is ended at the first phase and no power is drawn any more for example, that an unbalanced load arises if electric consumers are connected to the other phases. This can be detected through the continuous monitoring, and thereby the charging power of the other electric consumers reduced so that the unbalanced load threshold value is not exceeded.

A further advantageous possibility provides that the electricity grid is a three-phase electricity grid. Such three-phase electricity grids are usually made available by the energy supply companies.

A favourable variant provides that the electric consumers adjust the charging power drawn off with reference to the communicated power specifications. In this way it is ensured that a regulation of the charging power does indeed take place, so that the power threshold values and the unbalanced load threshold values can be maintained. It is obvious that the electric consumers do not necessarily have to draw off the maximum charging power available.

One particularly advantageous solution provides that the electric consumers connected for charging are electric vehicles. It is precisely with electric vehicles that very high charging powers occur in order to shorten the charging time of the electric vehicles, so that the problem of unbalanced load and of overload of individual phases is particularly relevant.

In the description and the appended claims, electric vehicles refer to motor vehicles that are driven at least partially by an electric drive and which comprise a store of electrical energy.

Further important features and advantages of the invention emerge from the subsidiary claims, from the drawing and from the associated descriptions of the FIGURE with reference to the drawing.

It is clear that the above-named features, and those still to be explained below, can not only be applied in the combination given in each case, but also in other combinations or alone, without leaving the scope of the present invention.

Preferred exemplary embodiments of the invention are illustrated in the drawing and are explained in more detail in the following description.

BRIEF DESCRIPTION OF THE DRAWINGS

The single FIG. 1 shows a block diagram of a charging system at which the method according to the invention can be carried out.

DETAILED DESCRIPTION

A system 10 illustrated in FIG. 1 comprises an electricity grid connection 15 with multiple phases 14, for example, a first phase 11, a second phase 12 and a third phase 13, to which electric consumers, for example electric vehicles 16, referred to below as the electric vehicle 16, can be connected for charging the electric vehicles 16. A control apparatus 18 is further provided which monitors the system 10. For this purpose a phase current measuring device 20 is provided for each phase 11, 12, 13, 14, which communicates the values of the measured phase currents to the control apparatus 18. Data connections 22 are preferably provided for communicating the values of the measured phase currents. Data connections 22 between the control apparatus 18 and the electric vehicles 16 are further provided, via which a power specification can be communicated from the control apparatus 18 to the electric vehicles 16.

As an alternative to the phase current measuring device 20, data from a networked electricity meter can also be evaluated in order to deduce the phase currents.

The control apparatus 18 controls the electric vehicles 16 in such a way that the currents drawn by the electric vehicles 16 through the individual phases 11, 12, 13, 14 are of such a nature that the individual phases 11, 12, 13, 14 are loaded within specified operating parameters.

These operating parameters comprise in particular a maximum power or a maximum phase current of the phases 11, 12, 13, 14. The operating parameters can, furthermore, also comprise a maximum unbalanced load between the phases 11, 12, 13, 14. The unbalanced load is defined as the greatest difference between the powers that are drawn off via the phases 11, 12, 13, 14. In particular, the unbalanced load is the load difference between the load of the phase 11, 12, 13, 14 via which the greatest power is being delivered to the load of the phase 11, 12, 13, 14 via which the smallest power is being delivered. The load, or the unbalanced load, can here, for example, be defined as the electric power or the electric current.

If a motor vehicle 16 is now connected for charging to one of the phases 11, 12, 13, 14, the control apparatus determines how great the maximum charging power available for the motor vehicle 16 is, and communicates this maximum charging power available at the time concerned to this motor vehicle 16. The motor vehicle 16 will then draw at most this charging power through the phase 11, 12, 13, 14. As the charging process continues, the control apparatus 18 will continuously monitor the phase currents of the individual phases 11, 12, 13, 14 and, if appropriate, communicate power specifications to the motor vehicles 16, which signal to the motor vehicles 16 that either more charging power may be drawn off or that the charging power must be reduced.

If, for example, only a single electric vehicle 16 is connected to one of the phases 11, 12, 13, 14, the maximum charging power available is given by the maximum unbalanced load. The maximum permissible unbalanced load is usually 20 amperes. It follows from this that the electric vehicle 16 can only charge at 20 amperes.

If a second electric vehicle 16 is connected to a further phase 11, 12, 13, 14, this can also be charged at 20 amperes. Finally when an electric vehicle 16 is also connected to a third phase 11, 12, 13, 14, a balancing of the load thus occurs, whereby the maximum charging power is no longer limited by the unbalanced load, but by the individual maximum load at the individual phases 11, 12, 13, 14.

Because the charging power of the electric vehicles 16 is not necessarily always the maximum charging power available, a continuous monitoring of the phase currents also takes place with three connected electric vehicles 16 in order, if necessary, to be able to reduce the charging currents of individual electric vehicles 16 in order to avoid exceeding the maximum permissible unbalanced load.

It is clear that more than one electric vehicle 16 can also be connected for charging to an individual phase 11, 12, 13, 14. More electric vehicles 16 can thus be charged simultaneously than the number of phases 11, 12, 13, 14 are available at the electricity grid.

The invention claimed is:

1. A method for charging electric consumers at an electricity grid with multiple phases, comprising:
   measuring a phase current of each of the multiple phases of the electricity grid at a balance point;
   determining to which of the multiple phases each electric consumer of the electric consumers is connected for charging via the balance point;
   holding an unbalanced load of the multiple phases below an unbalanced load threshold value via communicating a power specification to each electric consumer connected for charging the power specification including one of i) an amount of a charging power which may be additionally drawn at a time concerned and ii) an amount by which the charging power being drawn must be reduced;
   when the phase current of one phase of the multiple phases lies below a load threshold value and the phase current of the one phase is smaller than a lowest measured phase current of another one of the multiple phases with the addition of the unbalanced load threshold value, signaling that additional charging power may be drawn via the power specification; and
   when the phase current of one phase of the multiple phases at least one of: i) lies above the load threshold value and ii) is greater than the lowest measured phase current of another one of the multiple phases with the addition of the unbalanced load threshold value, signaling that the charging power must be reduced via the power specification.

2. The method according to claim 1, wherein the power specification includes a maximum charging power available at a time concerned.

3. The method according to claim 2, further comprising determining a maximum charging power available at the time concerned of a respective phase of the multiple phases based on at least the phase current of each of the multiple phases at the time concerned, a maximum permissible power of the respective phase, and a maximum permissible unbalanced load between the multiple phases.

4. The method according to claim 2, further comprising, when an electric consumer of the electric consumers is connected for charging, determining a phase of the multiple phases to which the electric consumer is connected, determining a maximum charging power available at the time concerned of the phase to which the electric consumer is connected, and communicating the maximum charging power available at the time concerned to the electric consumer.

5. The method according to claim 1, further comprising selecting the power specification such that an individual load of an individual phase of the multiple phases is held, in each case, below a load threshold value.

6. The method according to claim 1, wherein the phase current of each of the multiple phases at the balance point is continuously measured, the method further comprising continuously adjusting the power specification based on the measured phase current of each of the multiple phases and communicating an adjusted power specification to a respective one of the electric consumers.

7. The method according to claim 1, wherein the electric consumers adjust the charging power drawn off with reference to the communicated power specification.

8. The method according to claim 1, wherein the electric consumers connected for charging are electric vehicles.

9. The method according to claim 1, wherein:
   the phase current of each of the multiple phases of the electricity grid is measured at the balance point via a phase current measuring device; and
   the method further comprises communicating the measured phase current of each of the multiple phases to a control apparatus.

10. The method according to claim 9, wherein the power specification is communicated to each electric consumer by the control apparatus via a plurality of data connections between the control apparatus and the electric consumers.

11. The method according to claim 1, further comprising deducing the phase current of each of the multiple phases of the electricity grid at the balance point via evaluating data from a networked electricity meter.

12. A method for charging at least one electric consumer, comprising:
   connecting the at least one electric consumer to at least one phase of a plurality of phases of an electricity grid for charging;
   measuring a phase current of each of the plurality of phases at a balance point;
   determining the at least one phase to which the at least one electric consumer is connected;
   holding an unbalanced load of the plurality of phases below an unbalanced load threshold value via communicating a power specification to the at least one electric consumer; and
   wherein communicating the power specification includes communicating a maximum charging power available.

13. The method according to claim 12, further comprising drawing charging power from the electricity grid via the at least one electric consumer to charge the electric consumer, wherein communicating the power specification includes communicating one of: i) an amount of charging power which may be additionally drawn, and ii) an amount by which drawn charging power must be reduced.

14. The method according to claim 13, wherein communicating the power specification includes:
   communicating the amount of charging power which may be additionally drawn when the phase current of one phase of the plurality of phases lies below a load threshold value and the phase current of the one phase is smaller than a lowest measured phase current of another one of the plurality of phases with the addition of the unbalanced load threshold valve; and communicating the amount by which drawn charging power must be reduced when the phase current of one phase of the plurality of phases at least one of i) lies above the load threshold value and ii) is greater than the lowest measured phase current of another one of the plurality of phases with the addition of the unbalanced load threshold valve.

15. The method according to claim 12, further comprising determining a maximum charging power available of a respective phase of the plurality of phases based on at least the phase current of each of the plurality of phases, a maximum permissible power of the respective phase, and a maximum permissible unbalanced load between the plurality of phases.

16. The method according to claim 12, further comprising determining the maximum charging power available of the at least one phase to which the at least one electric consumer is connected, and wherein the maximum charging power available is communicated to the at least one electric consumer when the at least one electric consumer is connected to the at least one phase.

17. The method according to claim 12, further comprising selecting the power specification such that a respective load of the plurality of phases is held below a load threshold value.

18. The method according to claim 12, wherein the phase current of each of the plurality of phases at the balance point is continuously measured, further comprising continuously adjusting the power specification based on the measured phase current of each of the plurality of phases and communicating an adjusted power specification to the at least one electric consumer.

19. A method for charging a plurality of electric consumers, comprising:

connecting each of the plurality of electric consumers to at least one phase of a plurality of phases of an electricity grid for charging;

measuring a phase current of each of the plurality of phases at a balance point;

determining the at least one phase to which each of the plurality of electric consumers is connected;

holding an unbalanced load of the plurality of phases below an unbalanced load threshold value via communicating an associated power specification of a plurality of power specifications to the each of the plurality of electric consumers;

determining a maximum charging power available of the at least one phase to which an electric consumer of the plurality of electric consumers is connected; and communicating the determined maximum charging power available to the electric consumer when the electric consumer is connected to the at least one phase.

20. The method according to claim 19, further comprising:

when the phase current of one phase of the multiple phases lies below a load threshold value and the phase current of the one phase is smaller than a lowest measured phase current of another one of the multiple phases with the addition of the unbalanced load threshold value, signaling that additional charging power may be drawn via the power specification;

when the phase current of one phase of the multiple phases at least one of: i) lies above the load threshold value and ii) is greater than the lowest measured phase current of another one of the multiple phases with the addition of the unbalanced load threshold value, signaling that the charging power must be reduced via the power specification; and wherein the power specification includes one of i) an amount of a charging power which may be additionally drawn at a time concerned and ii) an amount by which the charging power being drawn must be reduced.

* * * * *